United States Patent
Pursifull et al.

(10) Patent No.: US 11,927,149 B2
(45) Date of Patent: Mar. 12, 2024

(54) METHOD AND SYSTEM FOR MULTIPLE INJECTIONS

(71) Applicant: Ford Global Technologies, LLC, Dearborn, MI (US)

(72) Inventors: Ross Pursifull, Dearborn, MI (US); Ethan Sanborn, Saline, MI (US); Joseph Thomas, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/960,024

(22) Filed: Oct. 4, 2022

(65) Prior Publication Data

US 2023/0024149 A1 Jan. 26, 2023

Related U.S. Application Data (62) Division of application No. 17/157,849, filed on Jan. 25, 2021, now Pat. No. 11,492,994.

(51) Int. Cl.
*F02D 41/40* (2006.01)
*F02D 41/20* (2006.01)
*F02D 41/24* (2006.01)

(52) U.S. Cl.
CPC .......... *F02D 41/402* (2013.01); *F02D 41/20* (2013.01); *F02D 41/2467* (2013.01); *F02D 2041/2031* (2013.01); *F02D 2041/2055* (2013.01)

(58) Field of Classification Search
CPC .... F02D 41/402; F02D 41/20; F02D 41/2467; F02D 2041/2031; F02D 2041/2055; Y02T 10/40
See application file for complete search history.

(56) References Cited

U.S. PATENT DOCUMENTS

| 5,747,684 | A | * | 5/1998 | Pace | F02M 65/00 73/114.49 |
| 5,924,403 | A | * | 7/1999 | Thomas | F02D 41/345 123/436 |
| 6,032,642 | A | * | 3/2000 | Trumbower | F02D 41/402 123/299 |
| 6,244,241 | B1 | * | 6/2001 | Mamiya | F02D 41/2461 123/295 |
| 6,470,849 | B1 | * | 10/2002 | Duffy | F02D 41/403 123/305 |

(Continued)

FOREIGN PATENT DOCUMENTS

| KR | 20170067330 A | 6/2017 |
| KR | 101780365 B1 | 10/2017 |

(Continued)

*Primary Examiner* — Phutthiwat Wongwian
*Assistant Examiner* — Susan E Scharpf
(74) *Attorney, Agent, or Firm* — Vincent Mastrogiacomo; McCoy Russell LLP (57) ABSTRACT

Methods and systems are provided for adjusting injection timing of closely spaced multiple injections via a same injector. In one example, during an inter-injection spacing between a first injection and a second injection in a set of multiple injections being lower than a threshold period, an opening time of the second injection in the set of multiple injections may be adjusted based on another opening time of another second injection in a previous set of multiple injections.

8 Claims, 5 Drawing Sheets

(56) References Cited

U.S. PATENT DOCUMENTS

| | | | |
|---|---|---|---|
| 7,464,690 B1* | 12/2008 | Reitz | F02D 41/3836 |
| | | | 123/299 |
| 9,650,983 B2* | 5/2017 | Gautier | F02D 41/2438 |
| 10,954,880 B1 | 3/2021 | Thomas et al. | |
| 10,989,132 B2 | 4/2021 | Thomas et al. | |
| 11,293,372 B1 | 4/2022 | Pursifull et al. | |
| 2002/0096140 A1* | 7/2002 | Heinzelmann | F02D 41/403 |
| | | | 123/299 |
| 2002/0195081 A1* | 12/2002 | McGee | F02D 41/403 |
| | | | 123/492 |
| 2003/0164166 A1* | 9/2003 | Takeuchi | F02D 41/402 |
| | | | 123/674 |
| 2007/0119411 A1* | 5/2007 | Kerns | F02D 41/0007 |
| | | | 123/304 |
| 2013/0104848 A1* | 5/2013 | Klyza | F02D 41/3094 |
| | | | 123/445 |
| 2016/0363087 A1* | 12/2016 | Hollar | F02D 41/1456 |
| 2020/0291885 A1* | 9/2020 | Pursifull | F02M 65/003 |
| 2021/0017930 A1* | 1/2021 | Pursifull | F02D 41/3809 |

FOREIGN PATENT DOCUMENTS

| | | |
|---|---|---|
| KR | 20190006746 A | 1/2019 |
| KR | 101957516 B1 | 3/2019 |

\* cited by examiner

METHOD AND SYSTEM FOR MULTIPLE INJECTIONS

CROSS REFERENCE TO RELATED APPLICATIONS

The present application is a divisional of U.S. Non-Provisional patent application Ser. No. 17/157,849, entitled "METHOD AND SYSTEM FOR MULTIPLE INJECTIONS", and filed on Jan. 25, 2021. The entire contents of the above-listed application are hereby incorporated by reference for all purposes.

FIELD

The present description relates generally to methods and systems for adjusting injection timing of closely spaced multiple injections via a same injector.

BACKGROUND/SUMMARY

Engines may be configured with direct fuel injectors (DI) for injecting fuel directly into an engine cylinder and/or port fuel injectors (PFI) for injecting fuel into an intake port of an engine cylinder. During the intake stroke of an engine cycle, fuel may be delivered to a cylinder via an injector in a single injection event or multiple successive injection events. The inter-injection period between two successive injection events during a multiple injection or split injection via the same injector may be shorter than the inter-injection period between two single injection events via the injector.

Various approaches are used to adjust an amount of fuel injected and an injection timing for each injection event during a split injection. One example approach is shown by Gautier et al. in U.S. U.S. Pat. No. 9,650,983. Therein, during a split injection, a first, low injection pulse and a second, complementary fuel injection pulse are executed. Opening and/or closing time of the split injection may be used to adjust injection timings of subsequent injection events.

However, the inventors herein have recognized potential issues with such systems. As one example, during a multiple (split) injection, two consecutive injections from the same injector may be closely spaced causing the occurrence of the first injection in a set of multiple injections to affect the opening time of the subsequent (second) injection. Adjustment of injection timing of each of the first injection and second injection in a set of multiple injections based on opening and/or closing timing of prior injections may cause the second injection to have a shorter opening period. A delayed opening time or a shorter than desired opening period of the second injection may cause a lower than desired amount of fuel to be injected in the cylinder, thereby affecting engine performance.

In one example, the issues described above may be addressed by a method for an engine, comprising: during an inter-injection spacing between a first injection and a second injection in a second set of multiple injections being lower than a threshold period, adjusting an opening time of the second injection in the second set based on another opening time of another second injection in a first set of multiple injections. In this way, by adjusting opening timing of injection events in a split injection based on inter-injection spacing, a desired amount of fuel may be delivered to the cylinder.

As one example, during conditions when a single fuel injection is scheduled for a cylinder during an engine cycle, the opening time and pulse width of the fuel injection may be adjusted based on open/closing times of one or more previous injections. During conditions when multiple injections from the same injector are scheduled for a cylinder during an engine cycle, the opening time and pulse width of a first injection of a set of multiple injections may be adjusted based on an opening time of a first injection of a prior set of multiple injections via the same injector. Also, the opening time and pulse width of a second injection of the set of multiple injections may be adjusted based on an opening time of a second injection of the prior set of multiple injections via the same injector. Further, the opening timing of each injection in the multiple set of injections may be adjusted as a function of inter-injection spacing between two injections in a set of multiple injections.

In this way, by adjusting opening timing of injectors differently based on an inter-injection spacing between two consecutive fuel injections via a same injector, opening period for multiple injections may be maintained as desired. By maintaining the desired opening period for each injection, the entire amount of fuel scheduled to be delivered to a cylinder may be dispensed. The technical effect of adjusting opening time and pulse width of a second injection of a set of multiple injections based on an opening time of a second injection of a prior set of multiple injections via the same injector during a lower than threshold inter-injection spacing is that the accuracy of opening time may be improved and not be delayed due to closing of a first injection of the set of multiple injections. Overall, by injecting a scheduled amount of fuel to each cylinder during single and multiple injections, fuel efficiency and engine performance may be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
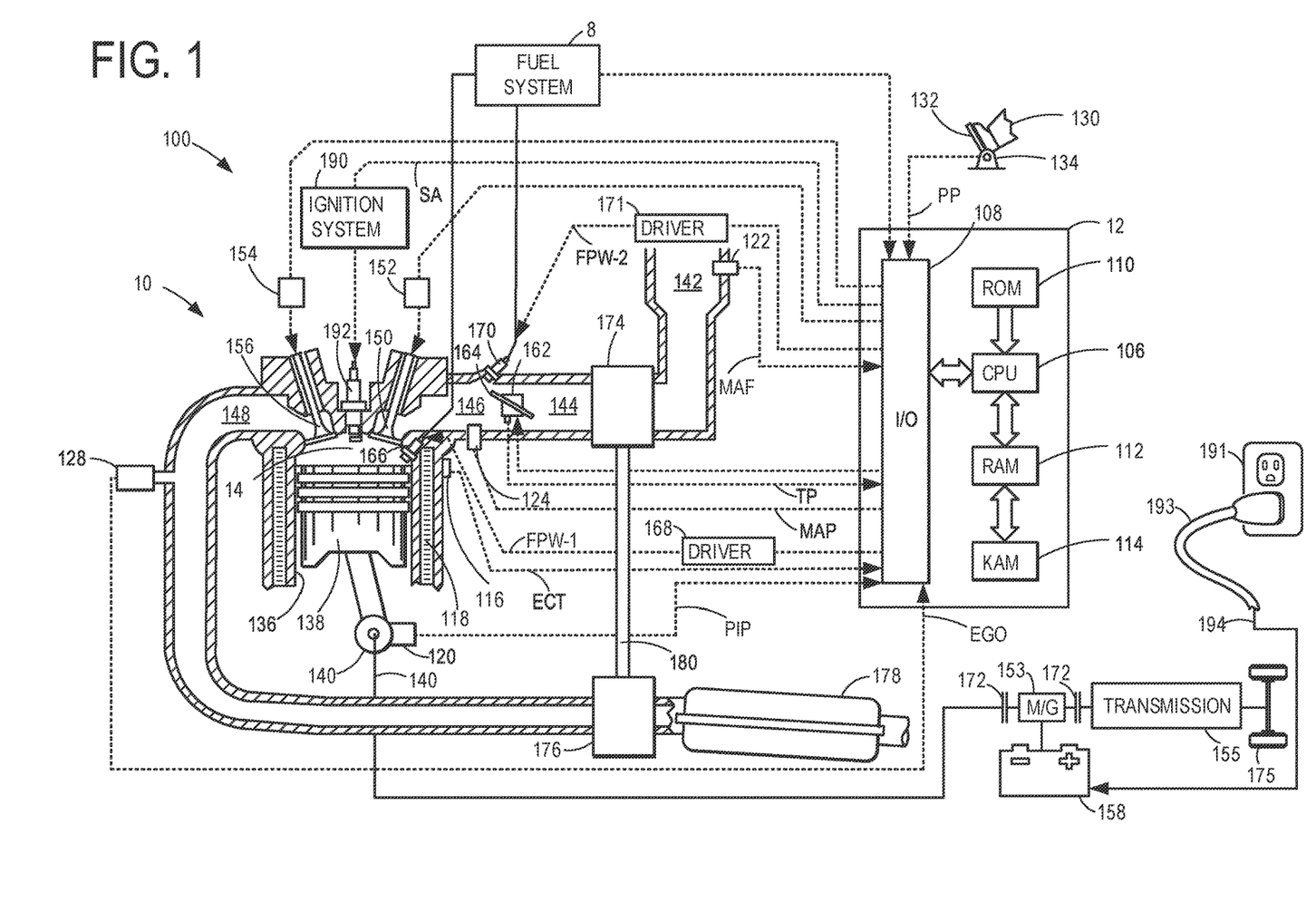
FIG. 1 schematically depicts an example embodiment of a cylinder of an internal combustion engine.
Figure 2:
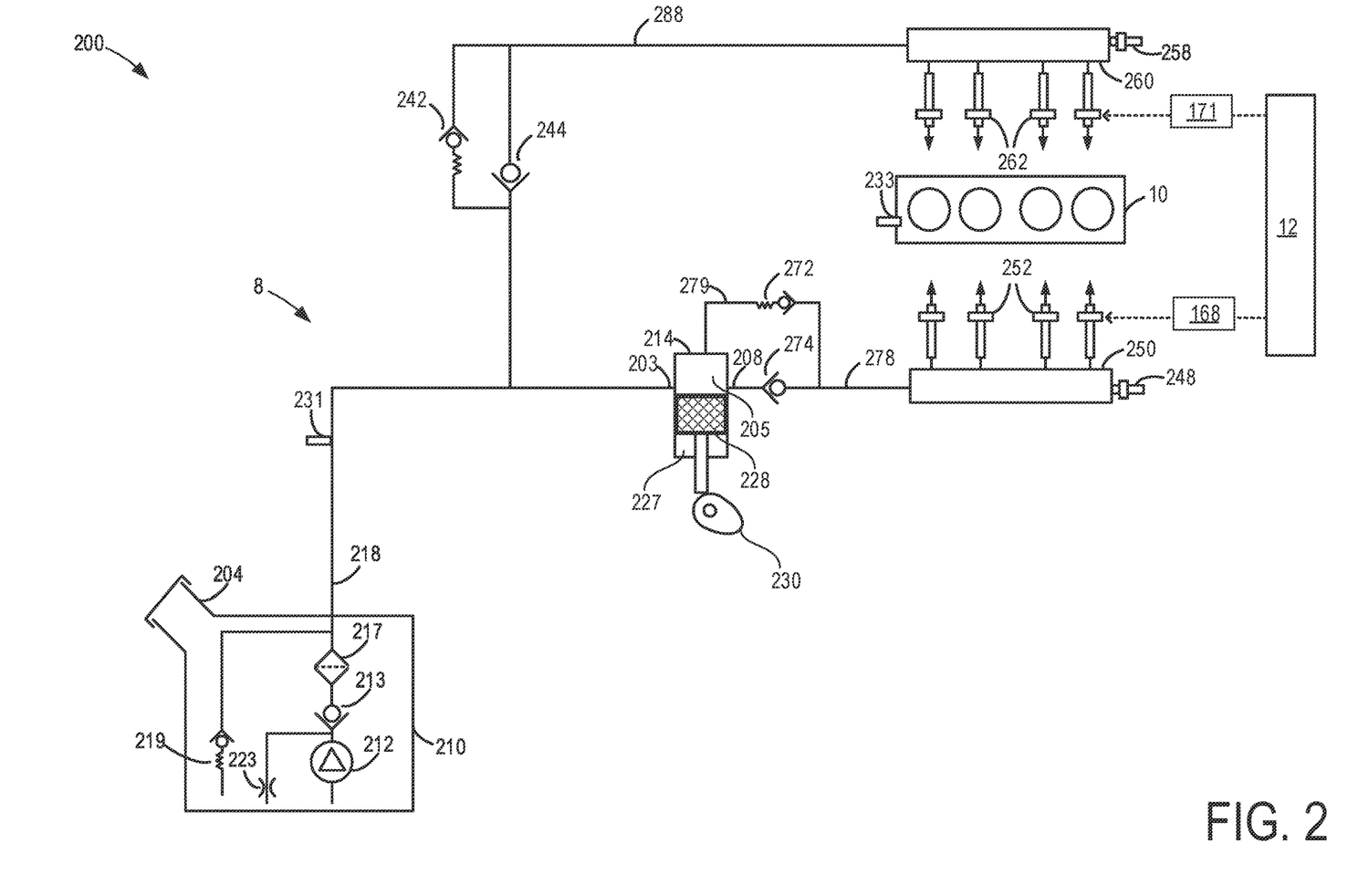
FIG. 2 schematically depicts an example embodiment of a fuel system, configured for port injection and direct injection that may be used with the engine of FIG. 1.
Figure 3A:
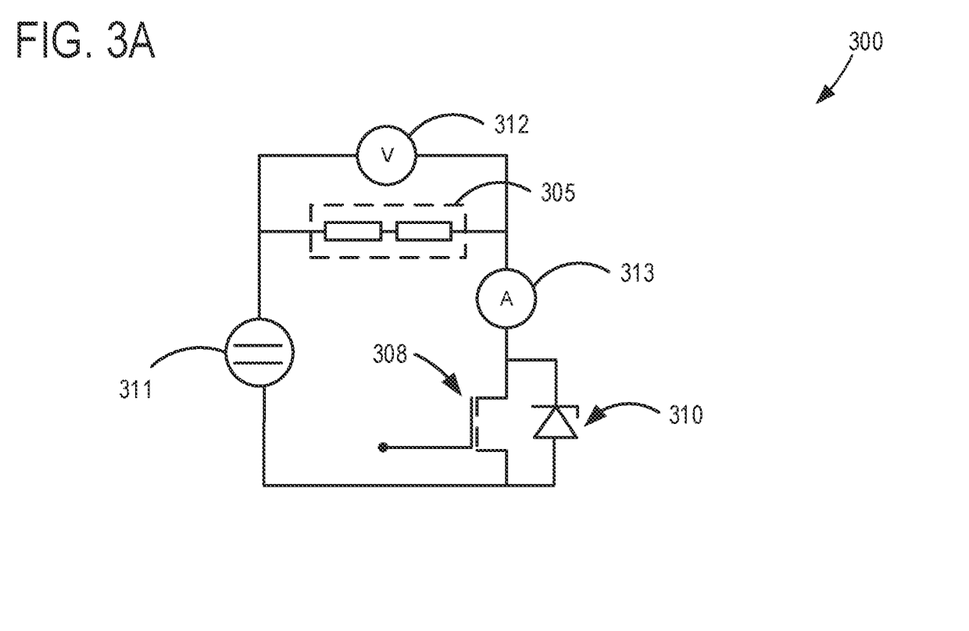
FIG. 3A shows an example circuit for energizing a fuel injector.
Figure 3B:
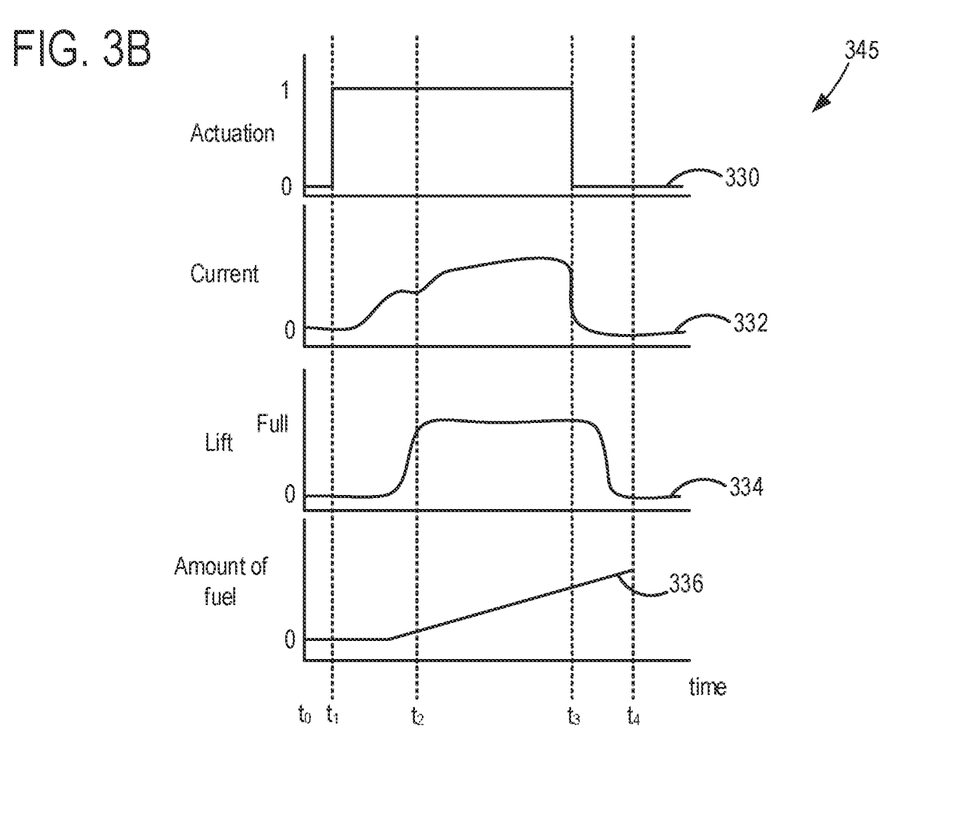
FIG. 3B shows an example actuation of an injector to dispense fuel to a cylinder.
Figure 5A:
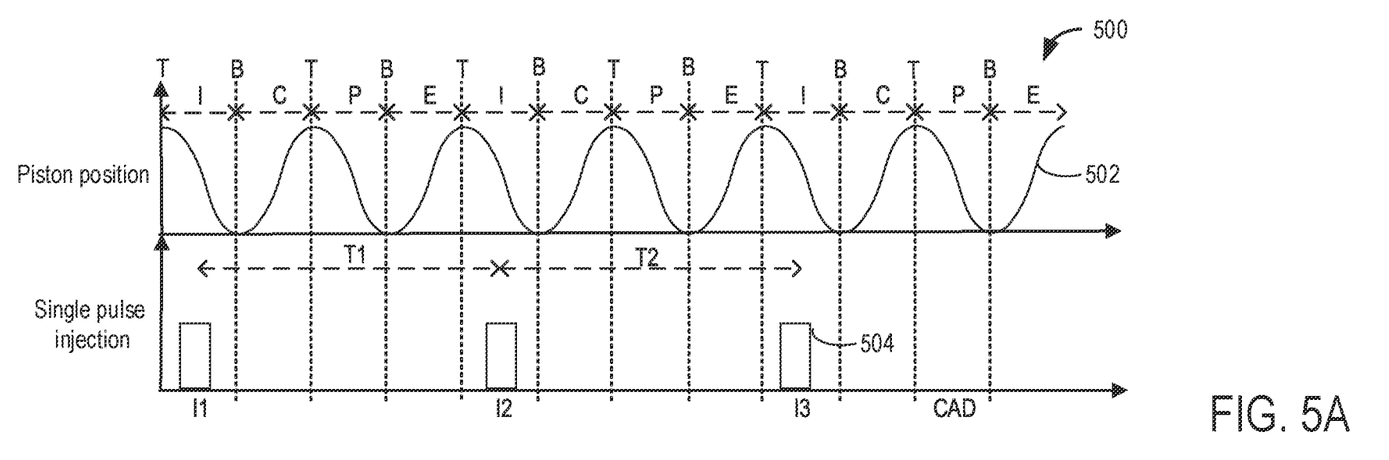
FIG. 5A shows a first example of fuel injection to a cylinder with a higher than threshold inter-injection spacing.
Figure 5B:
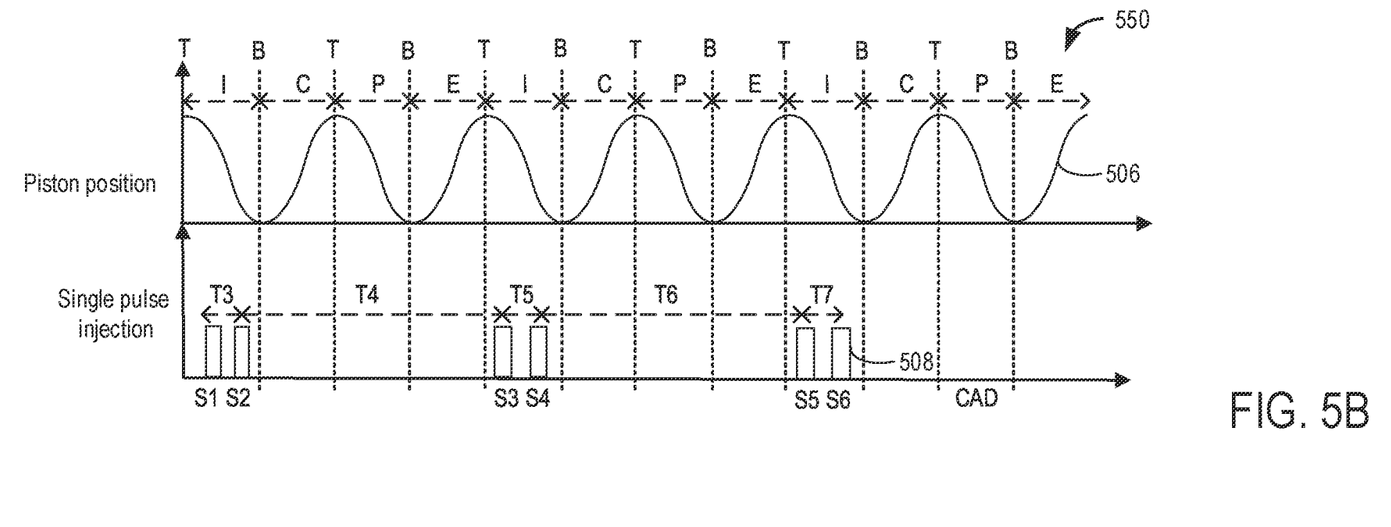
FIG. 5B shows a second example of split fuel injection to a cylinder with a lower than threshold inter-injection spacing.

The following description relates to systems and methods for adjusting injection timing of closely spaced multiple injections via a same injector. Accordingly, FIG. 1 depicts an example vehicle system that includes an engine system and a fuel system. FIG. 2 depicts a detailed view of the fuel system of FIG. 1, illustrating a set of direct injectors and a set of port injectors. An example circuit for energizing a fuel injector is shown in FIG. 3A and an example of operating the circuit to actuate the fuel injector is shown in FIG. 3B. A controller may be configured to adjust injection timing of fuel injectors based on inter-injection spacing. Examples of single and split fuel injections with different inter-injection spacings are shown in FIGS. 5A-5B.

Turning now to FIG. 1, depicted is an example of a combustion chamber or cylinder of internal combustion engine 10, included in vehicle system 100. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some examples, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other examples, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. It may be understood that driver 168 and driver 171 may in some examples be the same type of driver (e.g., the port fuel injector may be in some examples driving by a direct injection driver, to reduce or eliminate a dependency of battery voltage on time-to-open parameters for the port fuel injector). Thus, in some examples the type of driver that is used to drive port fuel injectors and direct injectors may be the same, whereas in other examples the type of driver that is used to drive port fuel injectors and direct injectors may be different. However, it may be understood that a PFI driver may not be used for driving direct fuel injectors.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector. As such, it should be appreciated that the fuel systems described herein should not be limited by the particular fuel injector configurations described herein by way of example.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

During an engine cycle, fuel may be delivered to cylinder 14 from injector 166 or 170 as a single injection or a set of multiple (split) injections. An inter-injection spacing between two consecutive single injections (via injector 166 or 170) may be higher than an inter-injection spacing between two consecutive split injections within a set of multiple injections (via injector 166 or 170). During a first inter injection spacing, injection timing may be adjusted based on opening/closing times of one or more previous injections, and during a second inter injection spacing, a first injection timing of a first injection of a second set of injections may be adjusted based on a first injection of a first set of injections, and a second injection timing of a second injection of the second set of injections may be adjusted based on a second injection of the first set of injection. The first inter injection spacing may be longer (such as in a single injection) than a threshold spacing, and the second inter injection spacing may be shorter (such as in a split/multiple injection) than the threshold spacing. The threshold spacing may be in a range of 4-6 ms. Each of the first set of injections and the second set of injections may be a split injection via a same injector. Also, a pulse width of the second injection of the second set of injections may be adjusted based on another pulse width of the second injection of the first set of injections. Adjusting the pulse width of the second injection of the second set may include increasing the pulse width of the second injection of the second set based on the another pulse width of the second injection of the first set of injections.

Fuel system 8 may include one or more fuel tanks. Fuel tank(s) in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

In still another example, fuels may be alcohol blends with varying alcohol composition wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities such as a difference in temperature, viscosity, octane number, etc. Moreover, fuel characteristics of one or both fuel tanks may vary frequently, for example, due to day to day variations in tank refilling.

While the above discussion related to a fuel system with two fuel tanks, it may be understood that the fuel system may simply include a single fuel tank in other examples, without departing from the scope of this disclosure.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. The controller 12 receives signals from the various sensors of FIG. 1 and employs the various actuators of FIG. 1 to adjust engine operation based on the received signals and instructions stored on a memory of the controller.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Vehicle system 100 may include multiple sources of torque available to one or more vehicle wheels 175. In the example shown, vehicle system 100 is a hybrid electric vehicle system (HEV) that includes an electric machine 153, however in other examples vehicle system may not be a hybrid electric vehicle system without departing from the scope of this disclosure. Electric machine 153 may be a motor or a motor/generator. Crankshaft 140 of engine 10 and electric machine 153 are connected via a transmission 155 to vehicle wheels 175 when one or more clutches 172 are engaged. In the depicted example, a first clutch is provided between crankshaft 140 and electric machine 153, and a second clutch is provided between electric machine 153 and transmission 155. Controller 12 may send a signal to an actuator of each clutch 172 to engage or disengage the clutch, so as to connect or disconnect crankshaft from electric machine 153 and the components connected thereto, and/or connect or disconnect electric machine 153 from transmission 155 and the components connected thereto. Transmission 155 may be a gearbox, a planetary gear system, or another type of transmission. The powertrain may be configured in various manners including as a parallel, a series, or a series-parallel hybrid vehicle.

Electric machine 153 receives electrical power from a traction battery 158 (also described herein as onboard energy storage device, energy storage device, or battery) to provide torque to vehicle wheels 175. Electric machine 153 may also be operated as a generator to provide electrical power to charge traction battery 158, for example during a braking operation.

Onboard energy storage device 158 may periodically receive electrical energy from a power source 191 residing external to the vehicle (e.g., not part of the vehicle) as indicated by arrow 194. As a non-limiting example, vehicle system 100 may be configured as a plug-in hybrid electric vehicle (PHEV), whereby electrical energy may be supplied to energy storage device 158 from power source 191 via an electrical energy transmission cable 193. During a recharging operation of energy storage device 158 from power source 191, electrical transmission cable 193 may electrically couple energy storage device 158 and power source 191. While the vehicle propulsion system is operated to propel the vehicle, electrical transmission cable 193 may disconnected between power source 191 and energy storage device 158. Controller 12 may identify and/or control the amount of electrical energy stored at the energy storage device, which may be referred to as the state of charge (SOC).

In other examples, electrical transmission cable 193 may be omitted, where electrical energy may be received wirelessly at energy storage device 158 from power source 191. For example, energy storage device 158 may receive electrical energy from power source 191 via one or more of electromagnetic induction, radio waves, and electromagnetic resonance. As such, it may be appreciated that any suitable approach may be used for recharging energy storage device 158 from a power source that does not comprise part of the vehicle.

FIG. 2 schematically depicts an example embodiment 200 of fuel system 8 discussed above at FIG. 1. Fuel system 8 may be operated to deliver fuel to an engine, such as engine 10 of FIG. 1. Fuel system 8 may be operated by a controller to perform some or all of the operations described with reference to the method of FIG. 4.

Fuel system 8 includes a fuel storage tank 210 for storing the fuel on-board the vehicle, a lower pressure fuel pump (LPP) 212 (herein also referred to as pulsed fuel lift pump 212), and a higher pressure fuel pump (HPP) 214 (herein also referred to as fuel injection pump 214). Fuel may be provided to fuel tank 210 via fuel filling passage 204. In one example, LPP 212 may be an electrically-powered lower pressure fuel pump disposed at least partially within fuel tank 210. LPP 212 may be operated by controller 12 to provide fuel to HPP 214 via fuel passage 218. LPP 212 can be configured as what may be referred to as a fuel lift pump. As one example, LPP 212 may be a turbine (e.g., centrifugal) pump including an electric (e.g., DC) pump motor, whereby the pressure increase across the pump and/or the volumetric flow rate through the pump may be controlled by varying the electrical power provided to the pump motor, thereby increasing or decreasing the motor speed. For example, as the controller reduces the electrical power that is provided to lift pump 212, the volumetric flow rate and/or pressure increase across the lift pump may be reduced. The volumetric flow rate and/or pressure increase across the pump may be increased by increasing the electrical power that is provided to lift pump 212.

LPP 212 may be fluidly coupled to a filter 217, which may remove small impurities contained in the fuel that could adversely impact fuel handling components. A check valve 213, which may facilitate fuel delivery and maintain fuel line pressure, may be positioned fluidly upstream of filter 217. With check valve 213 upstream of the filter 217, the compliance of low-pressure passage 218 may be increased since the filter may be physically large in volume. Furthermore, a pressure relief valve 219 may be employed to limit the fuel pressure in low-pressure passage 218 (e.g., the output from lift pump 212). Relief valve 219 may include a ball and spring mechanism that seats and seals at a specified pressure differential, for example. The pressure differential set-point at which relief valve 219 may be configured to open may assume various suitable values; as a non-limiting example the set-point may be 6.4 bar or 5 bar (g). An orifice 223 may be utilized to allow for air and/or fuel vapor to bleed out of the lift pump 212. This bleed at orifice 223 may also be used to power a jet pump used to transfer fuel from one location to another within the tank 210. In one example, an orifice check valve (not shown) may be placed in series with orifice 223. In some embodiments, fuel system 8 may include one or more (e.g., a series) of check valves fluidly coupled to low-pressure fuel pump 212 to impede fuel from leaking back upstream of the valves. In this context, upstream flow refers to fuel flow traveling from fuel rails 250, 260 towards LPP 212 while downstream flow refers to the nominal fuel flow direction from the LPP towards the HPP 214 and thereon to the fuel rails.

Fuel lifted by LPP 212 may be supplied at a lower pressure into a fuel passage 218 leading to an inlet 203 of HPP 214. HPP 214 may then deliver fuel into a first fuel rail 250 coupled to one or more fuel injectors of a first group of direct injectors 252 (herein also referred to as a first injector group, refer to fuel injector 166 at FIG. 1). Fuel lifted by the LPP 212 may also be supplied to a second fuel rail 260 coupled to one or more fuel injectors of a second group of port injectors 262 (herein also referred to as a second injector group, refer to fuel injector 170 at FIG. 1). HPP 214 may be operated to raise the pressure of fuel delivered to the first fuel rail above the lift pump pressure, with the first fuel rail coupled to the direct injector group operating with a high pressure. As a result, high pressure DI may be enabled while PFI may be operated at a lower pressure.

While each of first fuel rail 250 and second fuel rail 260 are shown dispensing fuel to four fuel injectors of the respective injector group 252, 262, it will be appreciated that each fuel rail 250, 260 may dispense fuel to any suitable number of fuel injectors. As one example, first fuel rail 250 may dispense fuel to one fuel injector of first injector group 252 (e.g., direct injectors) for each cylinder of the engine while second fuel rail 260 may dispense fuel to one fuel injector of second injector group 262 (e.g., port fuel injectors) for each cylinder of the engine. Controller 12 can individually actuate each of the port injectors 262 via port injection driver 171 and actuate each of the direct injectors 252 via direct injection driver 168. The controller 12, the drivers 171, 168 and other suitable engine system controllers can comprise a control system. While the drivers 171, 168 are shown external to the controller 12, it should be appreciated that in other examples, the controller 12 can include the drivers 171, 168 or can be configured to provide the functionality of the drivers 171, 168. Controller 12 may include additional components not shown, such as those included in controller 12 of FIG. 1. As discussed above, in some examples the driver 171 may be a direct injection driver and driver 168 may also be a direct injection driver. As mentioned above, relying on a DI driver may reduce or eliminate a dependency of battery voltage on time-to-open parameters for port fuel injectors.

HPP 214 may be an engine-driven, positive-displacement pump. As one non-limiting example, HPP 214 may be a Bosch HDP5 High Pressure Pump, which utilizes a solenoid activated control valve (e.g., fuel volume regulator, magnetic solenoid valve, etc.) to vary the effective pump volume of each pump stroke. The outlet check valve 274 of HPP is mechanically controlled and not electronically controlled by an external controller. HPP 214 may be mechanically driven by the engine in contrast to the motor driven LPP 212, however in other examples HPP 214 may be electronically controlled without departing from the scope of this disclosure. HPP 214 includes a pump piston 228, a pump compression chamber 205 (herein also referred to as compression chamber), and a step-room 227. Pump piston 228 receives a mechanical input from the engine crank shaft or cam shaft via cam 230, thereby operating the HPP according to the principle of a cam-driven single-cylinder pump. A sensor (not shown in FIG. 2) may be positioned near cam 230 to enable determination of the angular position of the cam (e.g., between 0 and 360 degrees), which may be relayed to controller 12.

A lift pump fuel pressure sensor 231 may be positioned along fuel passage 218 between lift pump 212 and higher pressure fuel pump 214. In this configuration, readings from sensor 231 may be interpreted as indications of the fuel pressure of lift pump 212 (e.g., the outlet fuel pressure of the lift pump) and/or of the inlet pressure of higher pressure fuel pump 214.

First fuel rail 250 may include a first fuel rail pressure sensor 248 for providing an indication of direct injection fuel rail pressure to the controller 12, however first fuel rail 250 may not include the first fuel rail pressure sensor in other examples without departing from the scope of this disclosure. Likewise, second fuel rail 260 may include a second fuel rail pressure sensor 258 for providing an indication of port injection fuel rail pressure to the controller 12, however second fuel rail 260 may not include the second fuel rail pressure sensor in other examples without departing from the scope of this disclosure. An engine speed sensor 233 can be used to provide an indication of engine speed to the controller 12. The indication of engine speed may be used to identify the speed of HPP 214, under conditions where HPP 214 is mechanically driven by the engine 10, for example, via the crankshaft or camshaft.

First fuel rail 250 is coupled to an outlet 208 of HPP 214 along fuel passage 278. Outlet check valve 274 and a pressure relief valve (also known as pump relief valve) 272 may be positioned between the outlet 208 of the HPP 214 and the first (DI) fuel rail 250. The pump relief valve 272 may be coupled to a bypass passage 279 of the fuel passage 278. Outlet check valve 274 opens to allow fuel to flow from the high pressure pump outlet 208 into a fuel rail only when a pressure at the outlet of direct injection fuel pump 214 (e.g., a compression chamber outlet pressure) is higher than the fuel rail pressure. The pump relief valve 272 may limit the pressure in fuel passage 278, downstream of HPP 214 and upstream of first fuel rail 250. For example, pump relief valve 272 may limit the pressure in fuel passage 278 to 200 bar. Pump relief valve 272 allows fuel flow out of the DI fuel rail 250 toward pump outlet 208 when the fuel rail pressure is greater than a predetermined pressure. Valves 244 and 242 work in conjunction to keep the low pressure fuel rail 260 pressurized to a pre-determined low pressure. Pressure relief valve 242 helps limit the pressure that can build in fuel rail 260 due to thermal expansion of fuel. While the above discussion included pump relief valve 272 and pressure relief valve 242, in other examples pump relief valve 272 and pressure relief valve 242 may not be included, without departing from the scope of this disclosure.

Based on engine operating conditions, fuel may be delivered by one or more port injectors 262 and direct injectors 252. For example, during high load conditions, fuel may be delivered to a cylinder on a given engine cycle via only direct injection, wherein port injectors 262 may be disabled. In another example, during mid load conditions, fuel may be delivered to a cylinder on a given engine cycle via each of direct and port injection. As still another example, during low load conditions, engine starts, as well as warm idling conditions, fuel may be delivered to a cylinder on a given engine cycle via only port injection, wherein direct injectors 252 may be disabled.

It is noted here that the high pressure pump 214 of FIG. 2 is presented as an illustrative example of one possible configuration for a high pressure pump. Components shown in FIG. 2 may be removed and/or changed while additional components not presently shown may be added to pump 214 while still maintaining the ability to deliver high-pressure fuel to a direct injection fuel rail and a port injection fuel rail.

Controller 12 can also control the operation of each of fuel pumps 212, and 214 to adjust an amount, pressure, flow rate, etc., of a fuel delivered to the engine. As one example, controller 12 can vary a pressure setting, a pump stroke amount, a pump duty cycle command and/or fuel flow rate of the fuel pumps to deliver fuel to different locations of the fuel system. A driver (not shown) electronically coupled to controller 12 may be used to send a control signal to the low pressure pump, as required, to adjust the output (e.g., speed, flow output, and/or pressure) of the low pressure pump.

Turning to FIG. 3A, an example circuit 300 is shown that may be used in some examples to actuate a fuel injector. Specifically, a fuel injector 305 (e.g., same as fuel injector 166, or same as fuel injector 170 in FIG. 1) may be actuated via the controller (e.g., controller 12 at FIG. 1), via circuit 300 that comprises a low-side power switch 308 with a Zener diode 310 in parallel. It may be understood that Zener diode 310 may protect circuit 300 from an overvoltage due to a self-induction, which may occur when the energization of the injector coil is stopped, for example.

In power-off mode with a current-less coil the valve mechanism ay be seated against a valve by a spring and a force of fuel pressure in the corresponding fuel rail. When power supply 311 is commanded on, the coil may be energized and an electromagnetic field may arise, thus de-seating the valve mechanism from the valve seat and enabling fuel to be injected to an engine cylinder. Deactivation of the energizing current may again lead to a closing of the injector upon sufficient decay of a magnetic field generated in the current-less coil. Voltage across the fuel injector 305 may be measured at first circuit location 312 and current through the circuit may be measured at second circuit location 313.

The decay of the magnetic field or the residual magnetic energy may be based on an initial amplitude of the magnetic field and a time since the deactivation of the energizing current. A shorter pulse width of an injection may generate a smaller magnetic field that may decay faster relative to a longer pulse. If two injections via fuel injector 305 are closely spaced such as with an inter-injection spacing between the two injections are less than a threshold duration, the opening time of the injector following an injection may be delayed until the magnetic field has completely decayed. The delay in opening may result in a shortened opening period during the injection causing a lower than desired amount of fuel to be dispensed.

In order to overcome this delay in opening of the injector following an injection with a shorter than threshold inter-injection period, the opening time of the injector during an immediately subsequent injection may be adjusted based on the inter-injection period. The opening time of a second injection in a set of multiple injections may be adjusted as a function of inter-injection spacing, wherein the function is based on opening times and/or closing times of one or more first injections and second injections in one or more sets of multiple injections preceding the set of multiple injections. During an inter-injection spacing between a first injection and a second injection in a second set of multiple injections being lower than a threshold period, an opening time of the second injection in the second set may be adjusted based on another opening time of another second injection in a first set of multiple injections. The threshold period may be estimated based on the decay of magnetic field generated in the current-less coil of the actuation mechanism of the injector during the first injection in the second set of multiple injections. The first set of multiple injections may precede the second set of multiple injections. The adjusting of the opening of the second injection may include delaying the opening of the second injection, a period of delaying the opening of the second injection inversely proportional to the inter-injection period.

FIG. 3B shows an example illustration 345 of actuation of the fuel injector 305 to dispense fuel to a cylinder. The example illustration 345 graphically depicts a relationship between an actuation pulse (plot 330), current in the circuit (plot 332), fuel injection valve lift (plot 334) and amount of fuel injected to an engine cylinder (plot 336). At time t0, no actuation voltage is supplied to the fuel injector (plot 330), and thus there is no current supplied either (plot 332). Accordingly, the valve has not yet opened at all (0 lift, plot 334), and no fuel has been injected to a corresponding engine cylinder (plot 336).

At time t1 the fuel injector is actuated (e.g., a voltage is supplied to the fuel injector). However, it takes some time until the valve mechanism reaches full lift. The delay time (e.g., time period between time t1 and t2 may depend on a number of variables including but not limited to actuation voltage, fuel pressure, manifold pressure, temperature, injector spring force, etc. An inflection point in the current at time t2 may be understood to be indicative of when the valve mechanism has reached full lift. Thus, it may be understood that by monitoring current (for example at second circuit location 313 at FIG. 5A), a time-to-open may be inferred.

A similar effect may be observed for injector closing as that observed for injector opening. For example, at time t3, voltage is stopped being supplied to the fuel injector. Current decreases accordingly between time t3 and t4, and the valve closes. While in this example illustration 345 current decays faster than the valve becomes fully closed, in other examples current may decay in a fashion that corresponds more closely to valve closing. More specifically, when the valve is no longer actuated at time t3, the induced magnetic field in the coil takes some time to dissipate, thus the valve does not immediately close when the voltage supply is discontinued.

In a case where the fuel injector is energized via the type of circuit depicted at FIG. 3A, it may be understood that a monitored voltage signal (e.g., at first circuit location 312 at FIG. 3A) may be used to infer when the valve is fully closed. Furthermore, as discussed above, a monitored current signal (e.g., at second circuit location 313 at FIG. 5A) may be used infer when the valve is fully open.

The fuel injector's inductive signature may also be used to measure both/either the opening time and the closing time of the injector. If a solenoid's current is monitored, the armature movement imposes a signature on the solenoid current. The time between applying an opening voltage/current and this opening signature is the measure of opening time. The time between removing an opening/hold voltage/current and this closing signature is the measure of closing time.

In this way, the systems of FIGS. 1-3A provide for a system for an engine, comprising: a controller with computer-readable instructions stored on non-transitory memory that when executed cause the controller to: during a first set of multiple injections via a first fuel injector during an engine cycle, learning each of a first opening time of a first injection of the first set and a second opening time of a second injection of the first set as a function of an inter-injection spacing between the first injection and the second injection, and during a second set of multiple injections via the first fuel injector during a subsequent engine cycle, adjust a third opening time of another first injection of the second set based on the learned first opening time, and adjusting a fourth opening time of another second injection of the second set based on the learned second opening time. The inter-injection spacing between the first injection and the second injection of the first set is same as another inter-injection spacing between the another first injection and anther second injection of the second set, the inter-injection spacing lower than a threshold spacing.

Figure 4:
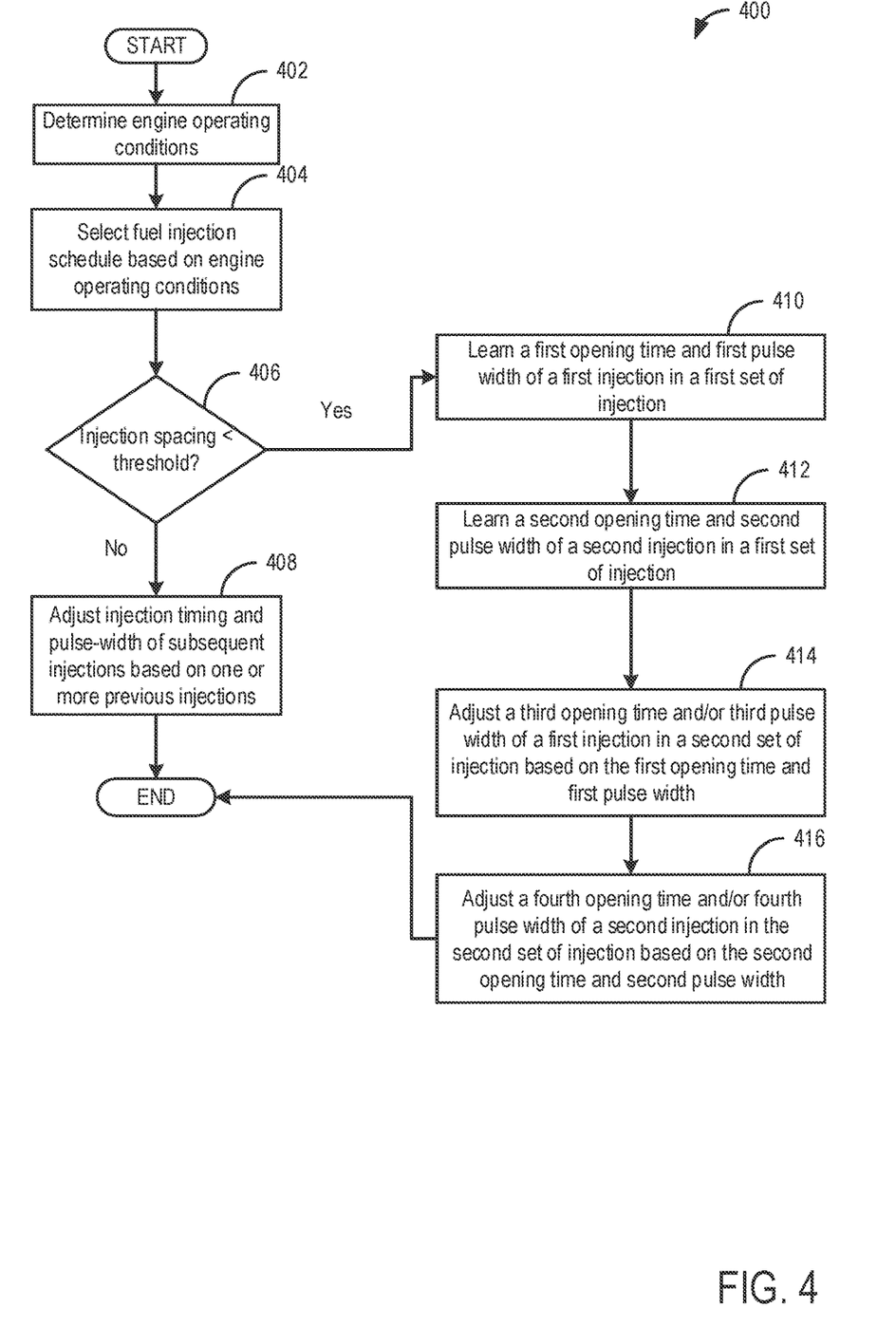
FIG. 4 shows a flow-chart of an example method for adjusting opening timing of fuel injectors based on inter-injection spacing.

FIG. 4 shows an example method 400 for adjusting opening timing of a fuel injector (such as fuel injector 166, or same as fuel injector 170 in FIG. 1) based on inter-injection spacing. The fuel injector may dispense fuel to a distinct engine cylinder. Opening timing may correspond to a full lift in the valve mechanism of the fuel injector caused upon application of voltage to the fuel injector. Pulse-width of an injection may be a duration of the fuel injector in full lift condition. Instructions for carrying out method 400 may be executed by a controller based on instructions stored on a memory of the controller and in conjunction with signals received from sensors of the engine system, such as the sensors described above with reference to FIGS. 1-3A. The controller may employ engine actuators of the engine system to adjust engine operation, according to the methods described below.

At 402, engine operating conditions may be determined by the controller. The engine operating conditions may include engine load, engine temperature, engine speed, operator torque demand, etc. Depending on the estimated operating conditions, a plurality of engine parameters may be determined. For example, at 404, a fuel injection schedule may be determined. This may include determining an amount of fuel to be delivered to a cylinder (e.g., based on the torque demand), as well as an injection timing. Further, a fuel injection mode best suited for the current engine operating conditions may be selected. In one example, at high engine loads, direct injection (DI) of fuel into an engine cylinder via a direct injector may be selected in order to leverage the charge cooling properties of the DI so that engine cylinders may operate at higher compression ratios without incurring undesirable engine knock. If direct injection is selected, the controller may determine whether the fuel is to be delivered as a single injection or split into multiple injections, and further whether to deliver the injection(s) in an intake stroke and/or a compression stroke. In another example, at lower engine loads and at engine starts (especially during cold-starts), port injection (PFI) of fuel into an intake port of the engine cylinder via a port fuel injector may be selected in order to reduce particulate matter emissions. If port injection is selected, the controller may determine whether the fuel is to be delivered during a closed intake valve event or an open intake valve event. There may be still other conditions where a portion of the fuel may be delivered to the cylinder via the port injector while a remainder of the fuel is delivered to the cylinder via the direct injector. Determining the fuel injection schedule may also include, for each injector, determining a fuel injector pulse-width as well as a duration between injection events (pulses) based on the estimated engine operating conditions.

At 406, the routine includes determining if a time period between two successive injection events (referred herein as inter-injection spacing) is lower than a threshold period. The threshold period may be pre-calibrated based on a decay of magnetic field in the injector following actuation of the injector. As discussed in relation to FIGS. 3A, B, even after voltage applied to the injector is discontinued, the induced magnetic field in the system may take some time to dissipate, thus the valve may not immediately close when the voltage supply is discontinued. The decay of magnetic field and the subsequent complete closing of the injector may affect the immediately subsequent opening of the valve if the inter-injection spacing between the two openings is shorter than the time period for magnetic field to decay. As an example, the threshold inter-injection spacing may be in a range of 4-6 ms.

In one example, if the fuel is to be delivered to the cylinder by the injector in a single injection, the inter-injection spacings between two single injections may be higher than the time period for decay of magnetic field following an injector opening. In another example, if the fuel is to be delivered to the cylinder by the injector in multiple injections in one engine cycle, the inter-injection spacings between two split injections in a set of multiple injections may be lower than the time period for decay of magnetic field following an injector opening.

FIG. 5A shows a first example 500 of fuel injection to the cylinder with a greater than threshold inter-injection spacing. Example 500 shows piston position, with respect to an engine position, for the engine cylinder. Further, example 500 illustrates an engine position along the x-axis in crank angle degrees (CAD). Curve 502 depicts piston positions (along the y-axis), with reference to their location from top dead center (TDC) and/or bottom dead center (BDC), and further with reference to their location within the four strokes (intake, compression, power and exhaust) of an engine cycle. As indicated by sinusoidal curve 502, a piston gradually moves downward from TDC, bottoming out at BDC by the end of the power stroke. The piston then returns to the top, at TDC, by the end of the exhaust stroke. The piston then again moves back down, towards BDC, during the intake stroke, returning to its original top position at TDC by the end of the compression stroke. The second plot depicts an example fuel injection profile 504 that may be utilized for the selected cylinder. For example, fuel injection profile 504 may be utilized for a nominal fuel injection, where a single fuel injection is utilized to deliver a desired amount of fuel in order to obtain a desired engine air-fuel ratio.

In this example, three single injections I1, I2, and I3 are shown during corresponding intake strokes of three consecutive engine cycles. The inter-injection spacing between I1 and I2 is denoted by T1 while the inter-injection spacing between I2 and I3 is denoted by T2. T1 and T2 may be equal or unequal based on the pulse width of each injection. T1 and T2 are higher than the threshold inter-injection spacing, therefore the closing time of an injection may not affect the opening time of the subsequent injection. The opening time of each injection may be adjusted based on learned opening/closing times of one or more prior injections.

FIG. 5B shows a second example 550 of fuel injection to the cylinder with a lower than threshold inter-injection spacing. Example 550 shows piston position, with respect to an engine position, for the engine cylinder. Further, example 550 illustrates an engine position along the x-axis in crank angle degrees (CAD). Similar to curve 502, curve 506 depicts piston positions (along the y-axis), with reference to their location from top dead center (TDC) and/or bottom dead center (BDC), and further with reference to their location within the four strokes (intake, compression, power and exhaust) of an engine cycle. The second plot depicts an example fuel injection profile 508 that may be utilized for the selected cylinder. For example, fuel injection profile 508 may be utilized for a nominal fuel injection, where multiple fuel injections is utilized to deliver a desired amount of fuel to a cylinder in order to obtain a desired engine air-fuel ratio.

In this example, three sets of multiple injections are shown during corresponding intake strokes of three consecutive engine cycles. During each intake stroke, the amount of fuel to be delivered to the cylinder may be divided between two closely spaced injections each taking place within the intake stroke. The first set of multiple injections may include a first injection, S1 and a second injection S2 with an inter-injection spacing of T3 between S1 and S2. The second set of multiple injections may include a first injection S3 and a second injection S4 with an inter-injection spacing of T5 between S3 and S4. The third set of multiple injections may include a first injection S5 and a second injection S5 with an inter-injection spacing of T7 between S5 and S6. The inter-injection spacing between S2 and S3 is denoted by T4 and the inter-injection spacing between S4 and S5 is denoted by T6. While T4 and T6 may be higher than the threshold inter-injection spacing, the inter-injections spacings T3, T5, and T7 between two injections within a set of multiple injections may be lower than the threshold inter-injection spacing.

Due to the shorter inter-injection spacings, the opening time of the second injections (such as S2, S4, and S6) of each set may be affected by the closing timing of the respective first injections (such as S1, S3, and S5) of each set. As elaborated below, the opening time of a first injection of each set may be learned and the opening time of the first injections of the subsequent sets may be adjusted based on the learned opening time. As an example, the opening time and pulse width for S1 may be learned and applied to adjust the opening time and pulse width of S3. Also, the opening time and pulse width for S3 may be learned and applied to adjust the opening time and pulse width of S5. Further each of the learned opening times and pulse widths of S1 and S3 may be used to adjust the opening time and pulse width of S5. Similarly, the opening time and pulse width of a second injection of each set may be learned and the opening time and pulse width of the second injections of the subsequent sets may be adjusted based on the learned opening time. As an example, the opening time and pulse width for S2 may be learned and applied to adjust the opening time and pulse width of S4. Also, the opening time and pulse width for S4 may be learned and applied to adjust the opening time and pulse width of S6. Further each of the learned opening times and pulse width of S2 and S4 may be used to adjust the opening time and pulse width of S6.

As an example, an injection pulse width may be divided into three parts: opening time, full lift time, and closing time. The opening and closing time can be measured using inductive signature methods. The total energization time is then opening time plus full lift time. The effective pulse width may be estimated as opening time minus closing time plus full lift time. During fuel injection to a cylinder, a fuel mass is selected which is converted into an effective pulse width. Based on anticipated opening and closing times and effective pulse width, compute an actual pulse width (total energization time) may be estimated. An opening time for the injections occurring shortly (0 to 6 milliseconds) after a previous injection may be effectively used to estimate the pulse width.

Returning to FIG. 4, if at 406 it is determined that the inter-injection spacing is higher than the threshold spacing, at 408 injection timing including opening time and closing time of subsequent injections based on opening and closing time of one or more previous injections. As described before, due to the higher inter-injection spacing, the opening time of an injection is not affected by residual magnetic field from an immediately previous injection. Injector opening and closing time for each injection was my learned based on current and voltage measured in the actuation circuit coupled to the injector. Accuracy of injector opening timing may be adjusted based on the learned injector opening and closing time of previous injections. Further, the pulse-width of an injection may also be adjusted based on the measured pulse-width of one or more previous injections.

If it is determined that the inter-injection spacing is lower than the threshold spacing, it may be inferred that the opening time of a second injection in a set of multiple injections may be affected by the closing time of the first injection in the set. At 410, a first opening time and a first pulse width of a first injection in a first set of multiple injections may be learned. A current signal in a circuit used to actuate the injector may be monitored to infer when the valve is fully open while a voltage signal in the circuit may be monitored to infer when the valve is fully closed. The learning may be carried out for a first injection of a series of multiple injections and stored in the memory of the controller. Also, the closing time of the first injection in each set of multiple injections may be learned and stored in the controller memory. In one example, injector opening time/closing time for a first injection in a set of multiple injections may be a first function of injector spacing. In another example, a first look-up table may be populated based on injector opening time/closing time for a first injection in a set of multiple injections and an inter-injection period between the first injection and the immediately subsequent second injection of the set. Injector opening time/closing time for a first injection in a set of multiple injections may be learned for a plurality of discrete inter-injection spacings (such as 6 ms, 4 ms, 2 ms, and 1 ms) and the first look-up table and/or the first function may be updated to correlate injector opening/closing time with inter-injection spacing.

Similarly, pulse-width for the first injection in the set of multiple injections may be a second function of injector spacing. A second look-up table may be populated based on pulse-width for the first injection in the set of multiple injections and an inter-injection period between the first injection and the immediately subsequent second injection of the set. Pulse-width for a first injection in a set of multiple injections may be learned for a plurality of discrete inter-injection spacings (such as 6 ms, 4 ms, 2 ms, and 1 ms) and the second look-up table and/or the second function may be updated to correlate injector opening/closing time with inter-injection spacing.

At 412, a second opening time and a second pulse width of a second injection in a first set of multiple injections may be learned. A current signal in a circuit used to actuate the injector may be monitored to infer when the valve is fully open while a voltage signal in the circuit may be monitored to infer when the valve is fully closed. The learning may be carried out for a second injection of a series of multiple injections and stored in the memory of the controller. Also, the closing time of the second injection in each set of multiple injections may be learned and stored in the controller memory. In one example, injector opening time/closing time for a second injection in a set of multiple injections may be a third function of injector spacing. In another example, a third look-up table may be populated based on injector opening time/closing time for a second injection in a set of multiple injections and an inter-injection period between the first injection and second injection of the set. Injector opening time/closing time for a second injection in a set of multiple injections may be learned for a plurality of discrete inter-injection spacing (such as 6 ms, 4 ms, 2 ms, and 1 ms) and the third look-up table and/or the third function may be updated to correlate injector opening/closing time with inter-injection spacing.

Similarly, pulse-width for the second injection in the set of multiple injections may be a fourth function of injector spacing. A fourth look-up table may be populated based on pulse-width for the second injection in the set of multiple injections and an inter-injection period between the first injection and the second injection of the set. Pulse-width for a second injection in a set of multiple injections may be learned for a plurality of discrete inter-injection spacing (such as 6 ms, 4 ms, 2 ms, and 1 ms) and the fourth look-up table and/or the fourth function may be updated to correlate injector opening/closing time with inter-injection spacing.

At 414, a third opening time and/or a third pulse width of a first injection in a second set of multiple injections may be adjusted based on the learned first opening time and/or the first pulse width of the first injection in the first set of multiple injections. The second set of multiple injections may be carried out immediately after the first set of multiple injections, where the same injector delivers fuel to the same cylinder. The inter-injection period between the first and second injections in the first set may be equal to the inter-injection period of the first and second injections in the second set. If the inter-injection period (between first and second injection in a set) for the current set of injection is different from that of the immediately previous set, the third opening time and the third pulse width of a first injection in current set of multiple injections may be adjusted based on the learned first opening time and first pulse width of the first injection in another preceding set of injections where the inter-injection period between first and second injection is the same as the current injection. In one example, if the inter-injection spacing for the current set of injection is 5 ms, the third opening time and the third pulse width of a first injection in current set of multiple injections may be adjusted based on the learned opening time and the third pulse width of a first injection in a previous set of injections with the inter-injection spacing of 5 ms.

Also, the third injector opening time for the first injection in the second set of multiple injections may be adjusted based on the first function of injector spacing. Further, the injector opening time for the first injection in the second set of multiple injections may be adjusted based on the first look-up table populated with injector opening time/closing time for a first injection in a set of multiple injections and an inter-injection period between the first injection and the immediately subsequent second injection of the set. Similarly, the pulse width for the first injection in the second set of multiple injections may be adjusted based on the second look-up table populated with pulse width for a first injection in a set of multiple injections.

Adjusting the third injector opening time for the first injection in the second set of multiple injections may include delaying or advancing the opening timing from an originally scheduled opening time (at step 404) to ensure a desired amount of fuel is delivered to the cylinder. Also, adjusting the third pulse width may include increase or decreasing the pulse width relative to the originally scheduled (at step 404) to ensure the desired amount of fuel is delivered to the cylinder. As an example, the pulse-width (energization time of the injector) of the first injection in the second set of multiple injections may be adjusted as a function of a desired pulse width, an anticipated opening time, and an anticipated closing time. The pulse-width of the first injection in the second set of multiple injections may be reduced to enable scheduled opening of the subsequent injection in the same set of multiple injections At 416, a fourth opening time and/or a fourth pulse width of a second injection in the second set of multiple injections may be adjusted based on the learned second opening time and/or second pulse width of the first injection in the first set of multiple injections. The second set of multiple injections may be carried out immediately after the first set of multiple injections, where the same injector delivers fuel to the same cylinder. The inter-injection period between the first and second injections in the first set may be equal to the inter-injection period of the first and second injections in the second set. If the inter-injection period (between first and second injection in a set) for the current set of injections is different from that of the immediately previous set, the fourth opening time and the fourth pulse width of a first injection in the second (current) set of multiple injections may be adjusted based on the learned second opening time and second pulse width of the second injection in another preceding set of multiple injections where the inter-injection period between first and second injection is the same as the current injection. In one example, if the inter-injection spacing for the current set of injection is 5 ms, the fourth opening time and the fourth pulse width of a second injection in current set of multiple injections may be adjusted based on the learned opening time and the pulse width of a first injection in a previous set of injections with the inter-injection spacing of 5 ms.

Also, the fourth injector opening time for the second injection in the second set of multiple injections may be adjusted based on the third function of injector spacing. Further, the injector opening time for the second injection in the second set of multiple injections may be adjusted based on the third look-up table populated with injector opening time/closing time for a second injection in a set of multiple injections and an inter-injection period between the first injection and the immediately subsequent second injection of the set. Similarly, the pulse width for the second injection in the second set of multiple injections may be adjusted based on the fourth look-up table populated with pulse width for a second injection in a set of multiple injections.

In one example, if it is learned during the first set of multiple injections that the opening time of the second injection in the first set is delayed by a first period due to residual magnetic field from the first injection, the adjusting of the fourth opening time may include delaying the opening time for the second injection of the second set of multiple injections (following the first set) by the first period such that the second injection may start at the desired time and not get delayed (due to residual magnetic field from the first injection of the second set). In another example, if it is learned during the first set of multiple injections that the opening time of the second injection in the first set is delayed by a first period due to residual magnetic field from the first injection, the adjusting the fourth pulse width may include increasing the pulse width by the first period to enable the desired amount of fuel to be dispensed during the second injection of the second set. Overall, shorter multiple injection pulses may be scheduled based on learned opening times from prior characterized injections with same inter-injection periods.

In this way, by adjusting injection timing of a second injection in a current set of multiple/split injections based on one or more second injections in one or more previous sets of multiple/split injections, delay in start of the second injection may be reduced. By maintaining the desired opening period for each injection in a split injection, the entire amount of fuel scheduled to be delivered to a cylinder may be dispensed. Overall, by injecting a scheduled amount of fuel to each cylinder during multiple injections, fuel efficiency and engine performance may be improved.

An example method for an engine, comprising: during an inter-injection spacing between a first injection and a second injection in a second set of multiple injections being lower than a threshold period, adjusting an opening time of the second injection in the second set based on another opening time of another second injection in a first set of multiple injections. In the preceding example, additionally or optionally, the first set of multiple injections precedes the second set of multiple injections. In any or all of the preceding examples, additionally or optionally, the inter-injection spacing between the first injection and the second injection in the second set of multiple injections is equal to the inter-injection spacing between the another first injection and the another second injection in the first set of multiple injections. In any or all of the preceding examples, additionally or optionally, each of the first injection, the second injection, the another first injection, and the another second injection is from a same injector dispensing fuel to a same cylinder in an immediately preceding combustion event. Any or all of the preceding examples, further comprising, additionally or optionally, adjusting the opening time of the second injection in the second set of multiple injections as a function of inter-injection spacing, wherein the function is based on opening times and/or closing times of one or more first injections and second injections in one or more sets of multiple injections preceding the second set of multiple injections. In any or all of the preceding examples, the method further comprising, additionally or optionally, during the inter-injection spacing between the first injection and the second injection in the second set of multiple injections being lower than the threshold period, adjusting an opening time of the first injection based on another opening time of the another first injection in the first set of multiple injections. In any or all of the preceding examples, the method further comprising, additionally or optionally, adjusting pulse widths of one or more of the first injection and the second injection in the second set of multiple injections based on corresponding pulse widths of the another first injection and the another second injection in the first set of multiple injections. In any or all of the preceding examples, additionally or optionally, adjusting pulse-widths includes maintaining a first pulse width of the first injection in the second set and increasing a second pulse width of the second injection in the second set based on another second pulse width of the another second injection in the first set of multiple injections. In any or all of the preceding examples, additionally or optionally, adjusting the opening of the second injection includes delaying the opening of the second injection, a period of delaying the opening of the second injection inversely proportional to the inter-injection period. In any or all of the preceding examples, additionally or optionally, the adjusting of the opening time of the first injection is based on a function of the inter-injection spacing between the first injection and the second injection. In any or all of the preceding examples, additionally or optionally, the threshold period is based on a decay of magnetic field generated in an actuation mechanism of the same injector during the first injection in the second set of multiple injections. In any or all of the preceding examples, additionally or optionally, during the inter-injection spacing between two consecutive injections by the same injector being higher than the threshold period, the method further includes, adjusting an opening time of each injection based on opening times/closing times of one or more previous injections by the same injector regardless of the inter-injection spacing.

Another example for an engine in a vehicle, comprising: during a first inter injection spacing, adjusting injection timing based on opening/closing times of one or more previous injections, and during a second inter injection spacing, adjusting a first injection timing of a first injection of a second set of injections based on a first injection of a first set of injections, and adjusting a second injection timing of a second injection of the second set of injections based on a second injection of the first set of injection. In the preceding example, additionally or optionally, the first inter injection spacing is longer than a threshold spacing, and wherein the second inter injection spacing is shorter than the threshold spacing, the threshold spacing being in a range of 4-6 ms. In any or all of the preceding examples, additionally or optionally, each of the first set of injections and the second set of injections is a split injection via a same injector. In any or all of the preceding examples, the method further comprising, additionally or optionally, adjusting a pulse width of the second injection of the second set of injections based on another pulse width of the second injection of the first set of injections. In any or all of the preceding examples, additionally or optionally, adjusting the pulse width of the second injection of the second set includes increasing the pulse width of the second injection of the second set based on the another pulse width of the second injection of the first set of injections.

Another example system for an engine, comprising: a fuel injector, and a controller with computer-readable instructions stored on non-transitory memory that when executed cause the controller to: during a first set of multiple injections via a first fuel injector during an engine cycle, learning each of a first opening time of a first injection of the first set and a second opening time of a second injection of the first set as a function of an inter-injection spacing between the first injection and the second injection, and during a second set of multiple injections via the first fuel injector during a subsequent engine cycle, adjust a third opening time of another first injection of the second set based on the learned first opening time, and adjusting a fourth opening time of another second injection of the second set based on the learned second opening time. In the preceding example, additionally or optionally, an inter-injection spacing between the first injection and the second injection of the first set is same as another inter-injection spacing between the another first injection and anther second injection of the second set, the inter-injection spacing lower than a threshold spacing. In any or all of the preceding examples, additionally or optionally, the controller includes further instructions to: upon completion of the first set of multiple injections, update a function with the first opening time, the second opening time, and the inter-injection spacing between the first injection and the second injection, and during the second set of multiple injections, adjust each of the third opening time and the fourth opening time based on the updated function.

In another representation, a cylinder cycle may undergo two directly consecutive combustion cycles following a four stroke cycle. In the first cycle, a multiple direct injection provide is provided by the direct fuel injector, for example a double injection with close inter-injection spacing (e.g., less than 3 milliseconds for example). In this case, responsive to determining that the first cycle included the multiple injections and the close inter-injection spacing, the immediately subsequent cycle, also including the same number of injection pulses as the first cycle, includes adjustments to the first and second (in this example) injection timings that are tied directly to the respective first and second (in this example) injection timings of the first cycle. For example, learned timings (e.g., opening and/or closing) of the first pulse (only and not the second pulse) in the first cycle are applied to correct the injection timings of the first pulse (only, and not the second pulse) in the second cycle. Likewise, learned timings (e.g., opening and/or closing) of the second pulse (only and not the first pulse) in the first cycle are applied to correct the injection timings of the second pulse (only, and not the first pulse) in the second cycle. This is in contrast to when the inter-injection spacing is determined to be greater, e.g., greater than a threshold, such as 4 milliseconds), in which case learned timings (e.g., opening and/or closing) of the first pulse in the first cycle are applied to correct the injection timings of the first pulse and the second pulse in the second cycle; and/or learned timings (e.g., opening and/or closing) of the second pulse in the first cycle are applied to correct the injection timings of the second pulse and the first pulse) in the second cycle. The corrections may include a proportional adjustment of the timing being an offset applied to the pulse in the second cycle that is the product of a gain factor multiplied by an estimated timing error (e.g., of the pulse in the first cycle). The inter-injection spacing timing threshold may be adjusted responsive to engine speed, e.g., being decreased for increased engine speed in an example. Further the gain may be calibrated as a fixed value or be a gain calibrated as a function of engine load via a look-up table.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   during a first inter-injection spacing, adjusting injection timing based on opening times and/or closing times of one or more previous injections;
   during a second inter-injection spacing, adjusting a first injection timing of a first injection of a second set of injections based on a first injection of a first, previous set of injections, and adjusting a second injection timing of a second injection of the second set of injections based on a second injection of the first set of injections; and
   injecting fuel into the engine using one or more fuel injectors, the adjusted injection timing, and the adjusted second injection timing.

2. The method of claim 1, wherein the first inter-injection spacing is longer than a threshold spacing, and wherein the second inter-injection spacing is shorter than the threshold spacing, the threshold spacing being in a range of 4-6 ms.

3. The method of claim 1, wherein each of the first set of injections and the second set of injections is a split injection via a same injector.

4. The method of claim 1, further comprising adjusting a pulse width of the second injection of the second set of injections based on another pulse width of the second injection of the first set of injections.

5. The method of claim 4, wherein adjusting the pulse width of the second injection of the second set of injections includes increasing the pulse width of the second injection of the second set of injections based on the another pulse width of the second injection of the first set of injections.

6. A system for an engine, comprising:
   a fuel injector; and
   a controller with computer-readable instructions stored on non-transitory memory that when executed cause the controller to:
   inject fuel during a first set of multiple injections via the fuel injector during an engine cycle, learning each of a first opening time of a first injection of the first set and a second opening time of a second injection of the first set as a function of an inter-injection spacing between the first injection and the second injection; and
   inject fuel during a second set of multiple injections via the fuel injector during a subsequent engine cycle, adjust a third opening time of another first injection of the second set based on the learned first opening time, and adjusting a fourth opening time of another second injection of the second set based on the learned second opening time.

7. The system of claim 6, wherein an inter-injection spacing between the first injection and the second injection of the first set is same as another inter-injection spacing between the another first injection and anther second injection of the second set, the inter-injection spacing lower than a threshold spacing.

8. The system of claim 6, wherein the controller includes further instructions to:
   upon completion of the first set of multiple injections, update a function with the first opening time, the second opening time, and the inter-injection spacing between the first injection and the second injection; and
   during the second set of multiple injections, adjust each of the third opening time and the fourth opening time based on the updated function.

* * * * *